ated Dec. 28, 1971

United States Patent

[11] 3,630,263

[72] Inventor John Moseley Davies
 Amersham, England
[21] Appl. No. 18,140
[22] Filed Mar. 10, 1970
[45] Patented Dec. 28, 1971
[73] Assignee Parkson Industrial Equipment Company Limited
 Dartford, Kent, England
[32] Priority Mar. 12, 1969
[33] Great Britain
[31] 13,126/69

[54] EVAPORATION OF LIQUOR
 7 Claims, 3 Drawing Figs.
[52] U.S. Cl. .................................................. 159/17 VS,
 159/47, 203/24, 203/100, 202/233
[51] Int. Cl. ........................................................ B01d 1/26,
 B01d 1/00, B01d 3/00
[50] Field of Search ............................................ 159/24 A,
 24 R, DIG. 17, 17 VS, 17, 47; 203/24, 26, 100, 100
 DC; 202/233; 62/340

[56] References Cited
UNITED STATES PATENTS
2,282,982 5/1942 Jewett ........................... 203/24

2,777,514 1/1957 Eckstrom .................... 159/17
3,243,359 3/1966 Schmidt ...................... 202/174
3,410,339 11/1968 Wiegandt .................... 165/105
3,411,992 11/1968 Mitchell ..................... 203/26 X
3,446,711 5/1969 Rosenstein et al. .......... 203/10

Primary Examiner—Norman Yudkoff
Assistant Examiner—J. Sofer
Attorney—Brumbaugh, Graves, Donohue & Raymond ABSTRACT: Liquid water, is directly heated in a first heat exchanger by a hot immiscible H.E. fluid and the heated water is then passed to a second heat-exchanger where it indirectly heats a liquor to be evaporated. Vapor separated from the liquor passes to a third heat-exchanger and there in condensing evaporates at least some of a refrigerant which is the immiscible fluid. The refrigerant vapor is compressed and supplied to one or both of the first and second heat exchangers where it directly contacts said liquid water and is condensed, after which the condensed refrigerant is returned to the third heat exchanger partially evaporated there and the released vapor returned to the compressor. The refrigerant may be in an emulsion of refrigerant in water.

INVENTOR.
JOHN MOSELEY DAVIES

EVAPORATION OF LIQUOR

According to one aspect of the present invention, there is provided an apparatus for evaporating some of a liquor, including first, second and third heat exchanger, means for supplying material, then in the form of a liquid, to the first heat exchanger in order to heat the liquid and for supplying the heated material leaving the first heat exchanger to the second heat exchanger, means for passing said liquor through the second heat exchanger to be heated by said material, means for separating vapor from the liquor that leaves the second heat exchanger, means for supplying vapor separated from the liquor to the third heat exchanger, means for supplying a refrigerant at least mainly in liquid form to the third heat exchanger where at least part of the liquid content of it is vaporized by heat extracted from said vapor, a compressor for compressing vaporized refrigerant that leaves the third heat exchanger, means for supplying the compressed vaporized refrigerant to at least one of the first and second heat exchangers in which it directly contacts said material and itself condenses and means for then returning it to the third heat exchanger.

According to another aspect of the invention, there is provided a method of evaporating some of a liquor in which there are employed first, second and third heat exchangers, material, then in the form of a liquid, is supplied to the first heat exchanger and is there heated, the heated material leaving the first heat exchanger is supplied to the second heat exchanger, said liquor is passed through the second heat exchanger and is there heated by said material, vapor is separated from the liquor that leaves the second heat exchanger, vapor separated from the liquor is supplied to the third heat exhanger, refrigerant at least mainly in liquid form is supplied to the third heat exchanger where at least part of the liquid content of it is vaporized by heat extracted from said vapor, a compressor compresses vaporized refrigerant that leaves the third heat exchanger and the compressed vaporized refrigerant is supplied to at least one of the first and second heat exchangers in which it directly contacts said material and itself condenses, whereafter it returns to the third heat exchanger.

The liquid which is heated in the first heat exchanger may, for example, be water, and it is in fact referred to only as water in the following description but it could instead be another liquid, for example, a mineral oil.

A closed circuit is provided for the refrigerant and it is preferable to provide another one for the water so that it flows endlessly through the first and second heat exchangers. The material that flows from the first heat exchanger to the second is preferably simply hot water, although it could be steam if the refrigerant is appropriate.

The means for separating vapor from the liquor that leaves the second heat exchanger could be a separator from which the vapor flows directly to the third heat exchanger and from which the liquor is pumped away as a concentrated product. Instead, however, there could be one or more intermediate evaporation stages between the separator and the third heat exchanger. A third possibility is to have one or more flash-evaporation stages between the second and third heat exchangers.

If the liquor is such that it must not come into contact with inexpensive carbon steel, the first heat exchanger may be constructed of such steel and the second heat exchanger, and any further heat exchanger through which the liquor passes, may be made of stainless steel.

Examples in accordance with the invention are described below and diagrammatically illustrated in the accompanying drawings, in which.

Figure 1:
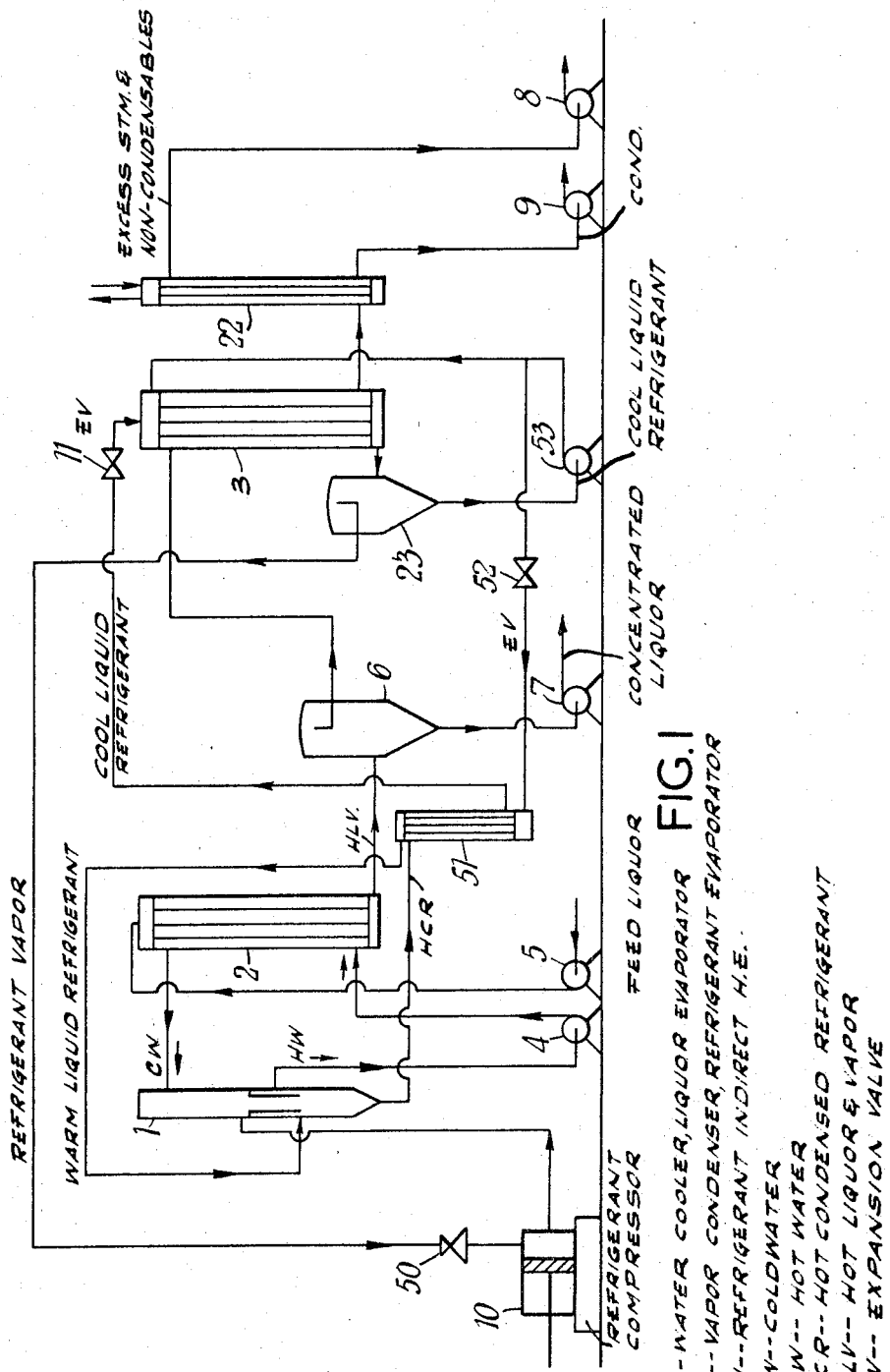
FIG. 1 shows a first apparatus for evaporation of some of a liquor.

In the apparatus according to FIG. 1, there are three heat exchangers 1, 2 and 3, of which the heat exchanger 1 is such that direct contact occurs within it between the two heat exchange media, whereas the heat exchangers 2 and 3 are of the indirect tube and shell type, with tubes of circular cross section or flat tubes. There is a closed circuit for water and it is pumped around the closed circuit by a pump 4, through the heat exchanger 1 in which it is heated and through the shell of the heat exchanger 2 in which hot water leaving the heat exchanger 1 is cooled by indirect heat exchange with the liquor to be concentrated, which is supplied by a pump 5 to the tubes of the heat exchanger 2, in which some of the liquor is vaporized. The hot liquid leaving the tubes of the heat exchanger 2 with the vapor passes to a separator vessel 6, from which concentrated liquor is drawn and pumped away by a pump 7. The separated vapor, for example at 38° C., flows into the shell of the heat exchanger 3. Some of the vapor condenses in the heat exchanger 3 and the condensate and remaining vapor pass to the shell of a heat exchanger 22 of the tube and shell type, in which more of the vapor is condensed by heat exchange with water flowing through the tubes. The condensate is pumped away by a pump 9 and the excess vapor and noncondensables including air are drawn off by a pump 8.

In the heat exchanger 3, the heat from the liquor vapor evaporates at least some of the liquid content of a refrigerant that is supplied wholly in liquid form or mainly in liquid form, i.e. with some vapor in it, to the tubes of the heat exchanger 3. There is a separator vessel 23 connected to the outlet of the tubes of the heat exchanger 3. The refrigerant vapor proceeds from the vessel 23 to a compressor 10 by way of an expansion control valve 50, whereas the unvaporized refrigerant leaving the tubes of the heat exchanger 3 is drawn from the vessel 23 by a pump 53 and returned to the tubes of the heat exchanger 3. The evaporated refrigerant supplied to the compressor 10 may, for example be at a temperature of about 32° C. Compressed refrigerant vapor leaving the compressor flows into the heat exchanger 1, where it makes direct contact with the water, so that it is itself condensed and the water is heated. The condensed refrigerant sinks to the bottom of the heat exchanger 1 and passes through the shell of a heat exchanger 51 before passing through an expansion valve 11 to the tubes of the heat exchanger 3. In the heat exchanger 3. In the heat exchanger 51, heat is transferred from the hot liquid refrigerant leaving the heat exchanger 1 to cold liquid refrigerant which is supplied to the tubes of the heat exchanger 51 by the pump 53 via an expansion valve 52. Warmed liquid refrigerant leaving the tubes of the heat exchanger 51 is supplied to the heat exchanger 1 in which is comes into contact with the cold water and helps to heat the water.

Figure 2:
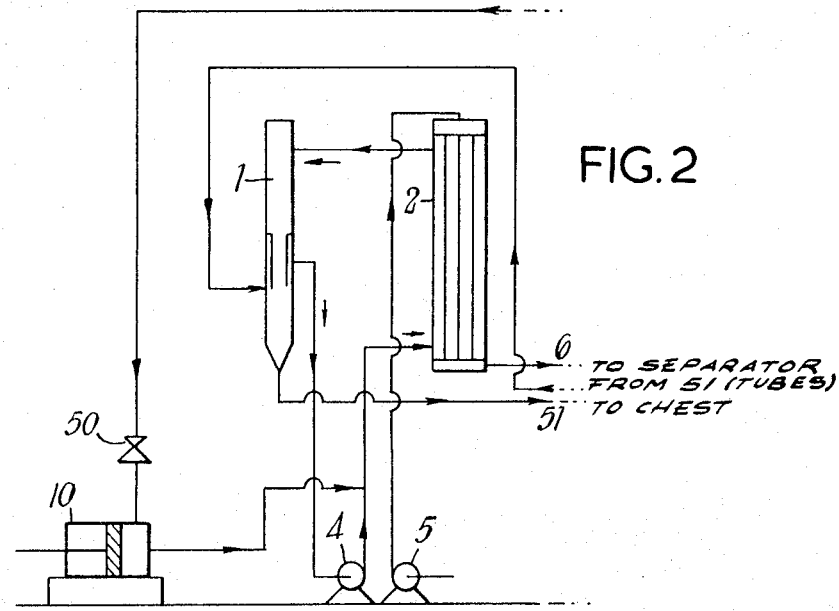
FIGS. 2 and 3 show modifications of part of what is shown in FIG. 1.
Figure 3:
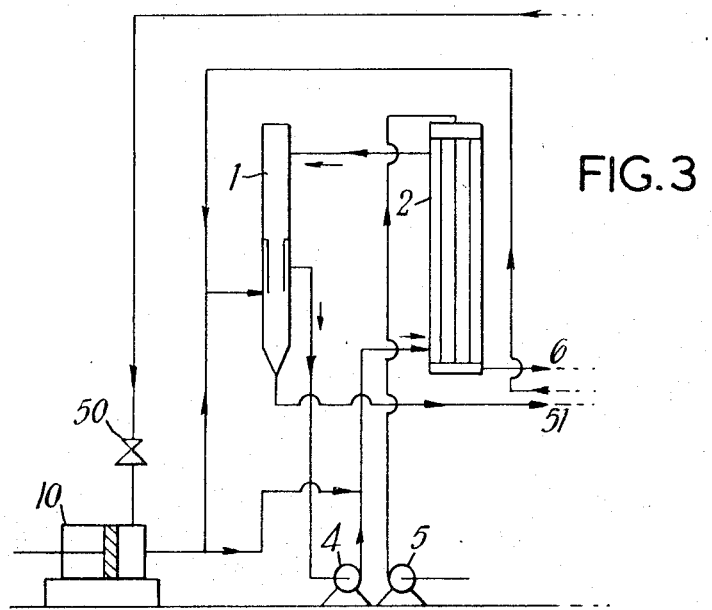

As shown in FIGS. 2 and 3, some (FIG. 3) or all (FIG. 2) of the compressed refrigerant vapor leaving the compressor 10 may be supplied not to the heat exchanger 1 but directly to the shell of the heat exchanger 2, where again it comes into contact with the water, although it cannot be said that it heats the water for in fact the water leaves the heat exchanger 2 at a temperature which is lower than that at which it enters this heat exchanger. The apparatus according to FIGS. 2 and 3 is otherwise the same as that shown in FIG. 1.

The temperature of the vapor passing from the separator vessel 6 to the heat exchanger 3 could be 100° C. or even higher, provided that a suitable refrigerant is used.

If desired, the single heat exchanger 2 could be replaced by two heat exchangers, connected in series or in parallel, so far as the flow of liquor to be evaporated is concerned, the two heat exchangers in the case of parallel operation being connected to the one separator vessel 6 or to two different separator vessels both of which supply vapor to the heat exchanger 3.

It is possible to dispense with the pumps 4 and 7 and to use flow under gravity from a heat tank for the water and simply to let the concentrated liquor run out of the separator vessel 6 through a pipe.

The refrigerant may be ammonia, "Freeon" (a registered trademark) or "Arcton 11," "Arcton 12," "Arcton 21" or "Arcton 22" ("Arcton" is a registered trademark.)

The compressor could be driven by a Diesel engine or a gas turbine, the waste heat of the engine or turbine being utilized for heating the water before and/or after it flows through the heat exchanger 1. Alternatively, the compressor could be driven by an electric motor.

A proportion of the concentrated liquor, instead of flowing out of the apparatus as a final product, could be passed through the apparatus again to be further concentrated.

In all of the examples described above, the material pumped around the closed circuit comprising the tubes of the heat exchanger 3 and the separator vessel 23, and through the tubes of the heat exchanger 51 to the heat exchanger 1, may be, instead of only liquid refrigerant, an emulsion of liquid refrigerant in water containing a suitable emulsifying agent. Refrigerant vapor, with traces of water vapor in it, then passes from the separator vessel 23 to the compressor 10 and substantially pure liquid refrigerant flows from the heat exchanger 1 through the shell of the heat exchanger 51 back to the heat exchanger 3.

I claim:

1. An apparatus for concentrating a liquor by evaporation, including first direct, second indirect and third indirect heat exchangers, means for supplying a first heat transfer liquid to the first heat exchanger in order to heat the liquid by direct contact with a compressed form of a second heat transfer fluid and for supplying the thereby heated first-mentioned heat transfer liquid leaving the first heat exchanger to the second heat exchanger, means for passing said liquid through the second heat exchanger to be heated indirectly by said first transfer liquid, means for separating vapor from the liquor that leaves the second heat exchanger and discharging the separated liquor, means for supplying the vapor separated from the liquor to the third indirect heat exchanger, means for supplying a refrigerant which is the second heat transfer fluid and at least mainly in liquid form, from the first heat exchanger to the third heat exchanger where at least part of its liquid content is vaporized by heat extracted indirectly from said liquor vapor, condensing the latter at least partially, a compressor for compressing vaporized refrigerant that leaves the third heat exchanger, means for supplying the compressed vaporized refrigerant to at least one of the first and second heat exchangers in which the refrigerant vapor directly contacts and heats said transfer liquid and itself condenses, and means for then returning the liquid refrigerant to the third heat exchanger.

2. An apparatus according to claim 1 comprising a closed circuit for the flow of said first transfer liquid between said first and second heat exchanger.

3. An apparatus according to claim 1 comprising an expansion valve through which the refrigerant returns to the third heat exchanger.

4. An apparatus according to claim 1 comprising a refrigerant vapor-liquid separating vessel and conduit connections between it and the third heat exchanger and between it and the compressor whereby the vapor-liquid refrigerant leaving the third heat exchanger passes into the separating vessel from which the refrigerant vapor proceeds to the compressor and unvaporized refrigerant returns to the inlet of the third heat exchanger.

5. An apparatus according to claim 1 comprising a further indirect heat exchanger and a conduit connection between it and the third heat exchanger whereby vapor extracted from the liquor and not condensed in the third heat exchanger passes to said further heat exchanger in which at least some of it is condensed.

6. An apparatus according to claim 1 comprising an additional indirect heat exchanger and conduit means whereby cooled refrigerant from the third heat exchanger is additionally supplied to the first heat exchanger by way of said additional heat exchanger in which it is heated by heat exchange with hot condensed refrigerant leaving the first heat exchanger and on its way back to the third heat exchanger.

7. A method of concentrating a liquor by evaporation in which there are employed first direct, second indirect and third indirect heat exchangers, a first heat transfer liquid, is supplied to the first heat exchanger and is there heated, the heated liquid leaving the first heat exchanger is supplied to the second heat exchanger, said liquor is passed through the second heat exchanger and is there heated by said liquid and partially vaporized vapor is separated from the liquor vapor mixture that leaves the second heat exchanger, vapor separated from the liquor is supplied to the third heat exchanger, a refrigerant immiscible with the first heat transfer liquid at least mainly in liquid form is supplied to the third heat exchanger where at least part of its liquid content is vaporized by heat extracted from said liquor vapor, a compressor compresses vaporized refrigerant that leaves the third heat exchanger and the compressed vaporized refrigerant is supplied to at least one of the first and second heat exchangers in which it directly contacts said heat transfer liquid and itself condenses, whereafter it is returned to the third heat exchanger.

* * * * *